(12) United States Patent
Mohalik et al.

(10) Patent No.: US 11,477,612 B2
(45) Date of Patent: Oct. 18, 2022

(54) METHOD AND LOCATION SERVICE COMPONENT FOR PROVIDING LOCATION OF DEVICE

(71) Applicant: Telefonaktiebolaget LM Ericsson (publ), Stockholm (SE)

(72) Inventors: Swarup Kumar Mohalik, Bangalore (IN); Ramamurthy Badrinath, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 16/955,880

(22) PCT Filed: Dec. 20, 2017

(86) PCT No.: PCT/IN2017/050606
§ 371 (c)(1),
(2) Date: Jun. 19, 2020

(87) PCT Pub. No.: WO2019/123469
PCT Pub. Date: Jun. 27, 2019

(65) Prior Publication Data
US 2021/0021963 A1    Jan. 21, 2021

(51) Int. Cl.
*H04W 4/029*     (2018.01)
*G01S 5/02*      (2010.01)
*G06N 20/00*     (2019.01)

(52) U.S. Cl.
CPC ........... *H04W 4/029* (2018.02); *G01S 5/0269* (2020.05); *G01S 5/0278* (2013.01); *G06N 20/00* (2019.01)

(58) Field of Classification Search
CPC ....... H04W 4/029; H04W 4/02; H04W 4/023; G06N 20/00; G01S 5/0269; G01S 5/0278
See application file for complete search history.

(56) References Cited

U.S. PATENT DOCUMENTS

| 2012/0157121 A1* | 6/2012 | Li | G01S 5/0018 |
| | | | 455/456.2 |
| 2014/0211691 A1* | 7/2014 | Emadzadeh | H04W 28/18 |
| | | | 370/328 |

(Continued)

FOREIGN PATENT DOCUMENTS

| GB | 2384952 A | 8/2003 |
| KR | 20160083663 A | 7/2016 |
| KR | 20160138678 A | 12/2016 |

OTHER PUBLICATIONS

Extended European Search Report dated May 12, 2021 for European Patent Application No. 17935586.2, 10 pages.

(Continued)

*Primary Examiner* — Umair Ahsan
(74) *Attorney, Agent, or Firm* — Sage Patent Group

(57) ABSTRACT

A method and a location service component for providing an estimate of a location related to a device are disclosed. The location service component receives a request from a client for the estimate of the location and estimates the location based on a predictive model to obtain an initial set of data items. Each data item includes a respective estimate of the location and a set of identities representing one or more further devices in a neighborhood of the device. The location service component obtains a respective location for each of the further devices based on the set of identities. The location service component removes data items that are inconsistent with the respective location for the further devices to obtain a pruned set of data items. The location service component sends, estimates of the pruned set of data items to the client. A corresponding computer program and a computer program carrier are also disclosed.

11 Claims, 7 Drawing Sheets

(56) References Cited

U.S. PATENT DOCUMENTS

2016/0216130 A1* 7/2016 Abramson ......... G01C 21/3423
2017/0357431 A1* 12/2017 Chang ................... H04W 64/00

OTHER PUBLICATIONS

International Search Report and Written Opinion of the International Searching Authority, PCT/IN2017/050606, dated Mar. 26, 2018, 9 pages.
CH Robotics; "Using Accelerometers to Estimate Position Velocity", 3 pages.
Herder et al.; "Predicting User Locations and Trajectories", L3S Research Center, Leibniz University Hannover, Germany, 2014, 12 pages.
Graves et al.; "Machine Learning I" Week 14: Sequence Learning, Introduction, Technische Universitat Munchen, Jan. 29, 2009, 33 pages.
OMA Specworks; Lightweight M2M (LWM2M), San Diego, California, 3 pages.
Etter et al.; "Where to go from here? Mobility prediction from instantaneous information" Pervasive and Mobile Computing 9 (2013) 784-797, Jul. 19, 2013, 14 pages.

* cited by examiner

METHOD AND LOCATION SERVICE COMPONENT FOR PROVIDING LOCATION OF DEVICE

This application is a 35 U.S.C. § 371 national stage application of PCT International Application No. PCT/IN2017/050606 filed on Dec. 20, 2017, the disclosure and content of which is incorporated by reference herein in its entirety.

TECHNICAL FIELD

Embodiments herein relate to Internet of things (IoT) systems, including devices often referred to as IoT devices. In particular, a method and a location service component for providing at least one estimate of a location related to a device, such as an IoT device, are disclosed. A corresponding computer program and a computer program carrier are also disclosed.

BACKGROUND

Existing IoT systems include already today large amounts of devices. It is expected that even more devices will be included in the IoT systems in the future. By 2020, there may be tens of billions of IoT devices out in the field according to some predictions. Many of these devices can have an independent power source, i.e. the device is equipped with one or more batteries or the like. However, when the batteries get discharged completely or are below a threshold, the device may no longer be able to communicate with a server, or the like, which manage these devices. Despite communication inability in relation to the devices, it may be desired to locate these devices for one or more of the following reasons:
1. If a device is in working condition, but a battery of the device is depleted such that communication with the server is not possible, it would be desired to replace the battery with a new one and dispose of the old battery in an environment-safe manner.
2. If the device itself is not in working condition because it is damaged or its warranty period has expired or it is beyond the factory-specified life-time, access to the device would be needed in order to replace/reuse/recycle the device.

Even though the batteries in many devices can last for years, after an initial hiatus, millions of devices will be depleted per year. Hence, these devices have to be located for the above reasons, otherwise waste, emanating from devices that have run out of power, is going to be overwhelming. Already, it is an issue with e-waste, but the issue will probably grow disruptively because of the unprecedented scale of the IoT realm. Moreover, many simple devices can last for a long time through battery replacement. Hence, locating the devices for battery replacement and renewed deployment is a cost-saving strategy for any large-scale deployments of devices.

IoT devices can be divided into two categories: static devices and mobile devices.

For static devices, a position is known at deployment time and this information can be used at any time to locate the IoT device since its position does not change over time and irrespectively of whether the device enters low/no power mode or not.

However, for mobile devices a position of the device is a function of time. Mobile devices, such as robots, cars, wheels, legs, etc., may be said to have embedded mobility means. A mobile device may also or alternatively be said to be mobile due to the fact that the device is attached to a mobile entity, such as a person, an object like containers, trucks etc. Henceforth, the mobile device remains mobile also after entering low/no power mode. Therefore, the position of the mobile device may need to be tracked continuously to be able to provide correct positioning information of any given mobile device at any time. The tracking of the position can be indirect, e.g. through analysis of historical, or past/previous positions, and through information about positioning of other device to which the mobile device is associated.

Furthermore, the mobile devices can be divided into at least two further groups based on whether the device itself includes a positioning capability or the device's position is governed by a location determining system. In both cases, a location query server may handle the location information in order to provide it on request.

A first group of devices include devices, including positioning capability, such as Global Positioning System (GPS) capability, indoor positioning capability, e.g. WiFi triangulation or the like. The devices can update the location query server with their position. Hence, a user that needs information about a position of a particular device is able to query the server to obtain a response indicating a position of the device. However, since the positioning capabilities need significant battery power, the position update can happen only when the devices are in normal power state. When the device's batteries have low/no power, the position of the mobile device cannot be updated. In this case, the server does not have access to the current position of the device and query for the device's location will return obsolete result, such as the last known position.

A second group of devices include devices that do not have GPS/indoor location capability. These devices do not operate in an isolated manner, but rather these devices need to communicate either through gateways or through other neighbouring devices (as in sensor networks). This communication ability can be used to locate the device e.g. Wi-Fi gateways can triangulate the position of Wi-Fi enabled IoT devices, radio frequency identification (RFID)-enabled IoT devices can be located by knowing that it is close to the location of the RFID receiver which detected the IoT device through RFID. However, if the device is completely discharged and is still mobile, e.g. it is mounted on a vehicle, it is not possible to pinpoint the position, because communication is not possible. In case, it is known that a device is mounted on a vehicle, then the location of the vehicle can be used to get the location of the device. However, the device may actually be attached to a container and may be transported to other vehicles and/or warehouses, in which case the association with the vehicle is broken. Thus, a position of the vehicle may not accurately indicate the position of the device.

According to a known method, http://www.chrobotics.com/library/accel-position-velocity, downloaded 7 Dec. 2017, a position is estimated based on accelerometer data history. For the illustrated method, accuracy may need to be improved. Additionally, accelerometer reading is required to be available, which may not always be the case for devices with low/no power, in particular no power.

US20160286363 discloses a method for associating a set of statically deployed live devices with each other and use that information to locate a particular device from the relative positions. However, this method requires communication from the devices and is applicable to fixed devices only. It is not applicable when devices are mobile and they are in low/no power mode when communication is not possible.

U.S. Pat. No. 9,497,196 discloses various techniques and systems for sharing, updating and storing status information between devices in a wireless network. However, it is a generic system and does not provide any analysis for locating mobile devices even when the devices are in low/no power mode.

Document "Mining Data Correlation from Multi-faceted Sensor Data in the Internet of Things" to Cao Dong et al, School of Computer Science, Carnegie Mellon University, Pittsburgh, 15213, USA, and State Key Lab of Networking and Switching Technology, Beijing University of Posts and Telecommunications, Beijing, 100876, China, discloses a method for correlating different types of data obtained at different points of time from IoT device and using that to predict the data in the future. However, the document is silent about positioning of IoT devices in low/no power mode.

Document "Where to go from here? mobility prediction from instantaneous information" to Etter, V., Kafsi, M., Kazemi, E., Grossglauser, M., Thiran, P., published in Pervasive and Mobile Computing 9 (6), 784-797 (2013), discloses sequence prediction routines which build Predictive Models via machine learning from trajectories of an object and update it as the trajectory changes with new position data. This is used to predict/estimate the position of an object. Disadvantageously, objects/devices in low/no power mode may not benefit from the disclosed method.

SUMMARY

In view of the above, an object may be to improve estimation of a position relating to a device, e.g. of the abovementioned kind, that has lost its ability to communicate with a server, or the like, that may perform estimation of the position.

According to an aspect, the object is achieved by a method, performed by a location service component, for providing at least one estimate of a location related to a device. The device is currently unable to report the location. The location service component receives, from a client component, a request for said at least one estimate of the location related to the device. Next, the location service component estimates the location based on a predictive model to obtain an initial set of data items. Each data item includes a respective estimate of the location related to the device and a set of identities representing one or more further devices in a neighbourhood of the device. The location service component obtains a respective location for each of said one or more further devices based on the set of identities.

Furthermore, the location service component removes any data item from the initial set of data items that is inconsistent with the respective location for said one or more further devices to obtain a pruned set of data items. The location service component sends, to the client component, one or more respective estimates of the pruned set of data items.

According to another aspect, the object is achieved by a location service component configured for providing at least one estimate of a location related to a device. The device is currently unable to report the location. The location service component is configured for receiving, from a client component, a request for said at least one estimate of the location related to the device. The location service component is configured for estimating the location based on a predictive model to obtain an initial set of data items. Each data item includes a respective estimate of the location related to the device and a set of identities representing one or more further devices in a neighbourhood of the device.

Furthermore, the location service component is configured for obtaining a respective location for each of said one or more further devices based on the set of identities. The location service component is configured for removing any data item from the initial set of data items that is inconsistent with the respective location for said one or more further devices to obtain a pruned set of data items. The location service component is configured for sending, to the client component, one or more respective estimates of the pruned set of data items.

According to further aspects, the object is achieved by a computer program and a computer program carrier corresponding to the aspects above.

The location service component estimates the location based on the predictive model, whereby the initial set of data items is obtained. The initial set of data items thus includes respective estimates of the location related to the device for each data item, where the respective estimates may be considered to be first approximation(s) of a set of final locations. The location service component further obtains the respective location for each of said one or more further devices, the location service component may be able validate the respective estimates of the location according to the initial set of data items. Then, the location service component may keep only a sub-set of the initial set of data items, where each data item of the sub-set is deemed to be valid. In order to achieve this, the location service component obtains the respective location for each of said one or more further devices. Next, the location service component removes, or prunes, any data item from the initial set of data items that is inconsistent with the respective location for said one or more further devices. In this manner, the location service component obtains the pruned set of data items, including one or more locations to be sent to the client component. As a result, the set of final locations may be represented by said one or more locations of the pruned set of data items.

Due to the removal of inconsistent data items, accuracy of said at least one estimate of the location is improved.

An advantage is, hence, that the location service component is able to provide said at least one estimate of the location also for the device, which has lost its ability to communicate with the location service component. The device may temporarily have lost its ability to communicate with the location service component due to insufficient power, such as low/no power. Alternatively or additionally, the device may have lost its ability to communicate with the location service component due to malfunction. In any case, the device may be handled, such as repaired or power source thereof may be recharged or replaced, as part of a lifecycle management for IoT devices. Therefore, IoT device may be handled in an environmental friendly manner, i.e. no use-and-waste. Moreover, costs related to handling of IoT devices may be reduced, such that devices can be found and then repaired, or power source renewed, which leads to that fewer new devices needs to be employed in the field as the old ones expire, in terms of lost communication and/or malfunction.

This means that the embodiments herein may efficiently address a so called IoT waste problem, which is predicted to become critical in a near future. Similarly to waste, such as bottles, cans etc., it is envisaged that there may be regulations on collection and disposal of IoT devices. The embodiments herein facilitate the collection task through provision of said at least one estimate of the location related to the devices, in fact regardless of whether the device is in a first mode, such as low/no power mode, or a second mode, such as a normal power mode. The embodiments are of course particularly advantageous for devices in the first mode, while it would not otherwise be possible to accurately obtain the locations of such device.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
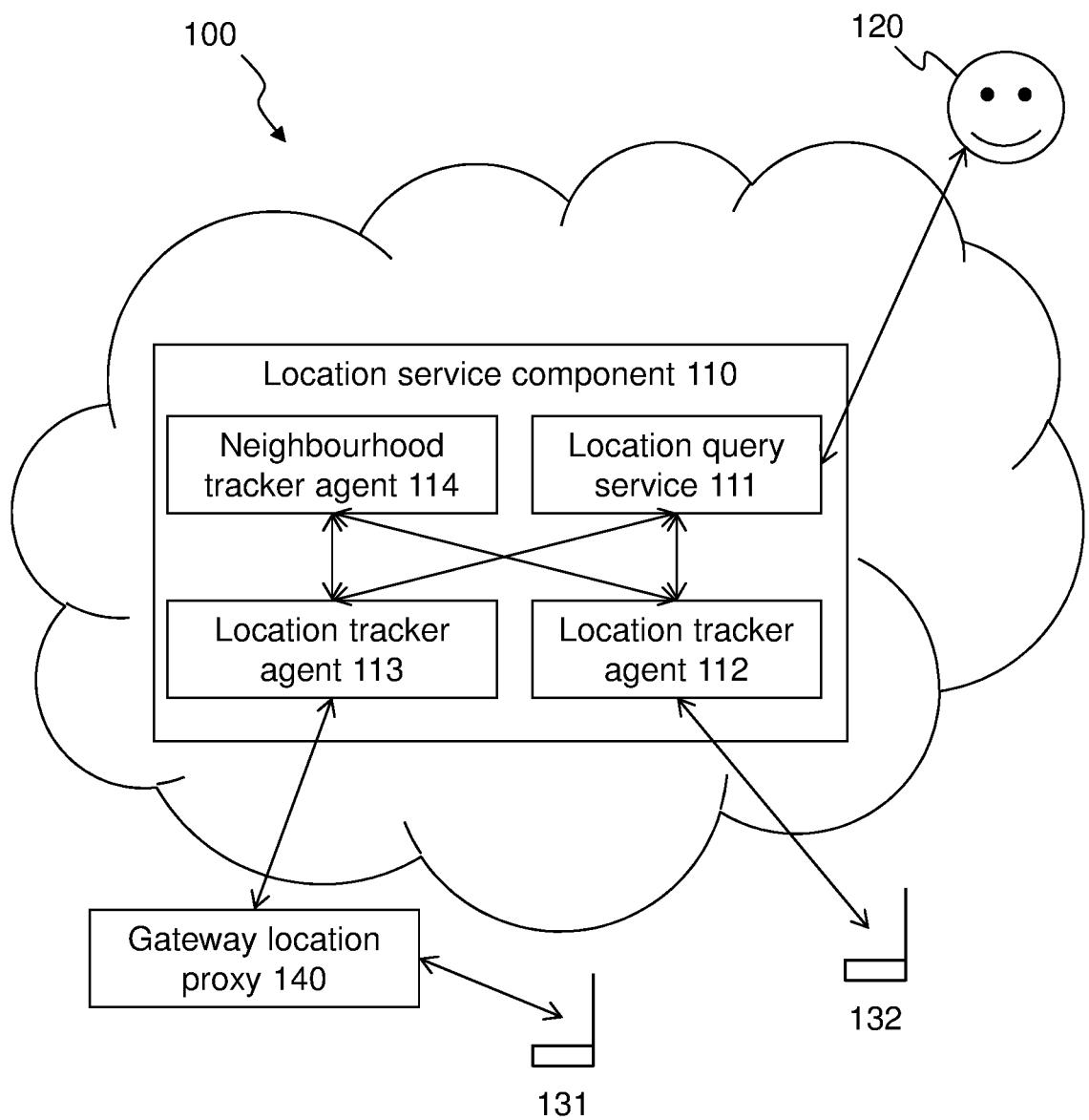
FIG. 1 is a schematic overview of an exemplifying system in which embodiments herein may be implemented.

In order to better appreciate the advantages and benefits of the embodiments herein, problems of the prior art are analysed here.

As indicated in the background section, a problem may be how to accurately estimate a current location of a device that 1) is considered to be mobile and 2) has currently lost its ability to communicate with its server for handling positioning information.

Before proceeding with a discussion about possible solutions to this problem, the following terms may be introduced.

Hence, as used herein, the term "first mode" may refer to that a device is currently considered to be unable to communicate with a server to which the device is intended to report its position. A reason for being unable to communicate with the server may be any one or more of that conditions for communication are poor, a power source of the device has not sufficient power, the device may malfunction such that communication is not possible. Additionally, the term "second mode" may refer to that the device is currently considered to be able to communicate with the server.

Now, a possible solution to the above problem may be to allow the device report its location just prior to battery power depletion. However, a location query for the device may come any time after the device entered the first mode, which may persist for a long time and during which the device may be mobile. Therefore, storing a last known location does not provide a complete solution, since it is expected that the accuracy of the last known location degrades with age of such last known location. The possible solution would work well for devices that are static in the first mode, but for devices that are mobile in the first mode inaccuracy would most probably be a major problem.

Another possible solution may be to use a system that can predict battery status and thereby enable preventive maintenance. This will ensure that a device is always in the first mode and hence render the stated problem non-existent. However, there may be unexpected depletions due to unforeseen application load and/or environment conditions due to which predictions may fail. Even in the case of correct predictions, there may be large gaps of time between the maintenance schedule and actual repair during which the battery depletes and location update is not done. Furthermore, such possible solution would not fulfil the need for handling devices that faces unexpected malfunction and therefore lose their communication capability, even if the power source of it is not depleted.

According to a further possible solution, in case modes of mobility of a device are known, the modes may be exploited to determine the location of the device. For example, if it is known that (i) the device is mounted in/on a particular vehicle and (ii) the location of that vehicle can be determined, it is possible to determine the location of that device. However, this does not suffice in case the vehicle itself does not have any positioning capability, which may be common for a smaller vehicle, like a bike, or when the device is manually moved, as in case the device is attached to a container and the container is moved from one truck to another truck or to a warehouse.

The embodiments herein may achieve an improvement over at least one of the aforementioned possible solutions.

Throughout the following description, similar reference numerals have been used to denote similar features, such as nodes, actions, units, circuits, parts, items, elements or the like, when applicable. In the Figures, features that appear in some embodiments are indicated by dashed lines.

FIG. 1 depicts an exemplifying system 100 in which embodiments herein may be implemented. In this example, the system 100 includes a network of computers and/or devices which may be connected to each other using wired and/or wireless technologies. The system 100 may constitute a portion of a cloud system, a portion of the Internet or the like.

The system 100 may thus include on one or more networks based on one or more of the following technologies: Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, Multi-Standard Radio (MSR), multi, any 3rd Generation Partnership Project (3GPP) cellular network, Wi-Fi networks, Worldwide Interoperability for Microwave Access (WiMAX), 5G system, wired technologies using copper and/or optic links or the any other suitable communication technology.

The system 100 may comprise a location service component 110, in which embodiments herein may be implemented. The location service component 110 may be realized as a service executing in a server computer, a cloud environment or the like.

As an exemplifying realization, the location service component 110 may include a location query service 111, a location tracker agent 112, 113 and a neighbourhood tracker agent 114.

FIG. 1 further illustrates a client component 120, embodied as a software unit or hardware unit, such as a computer, a terminal, a user equipment, a mobile phone, a communication device etc. When the client component 120 is embodied as a software unit, it may be executed in any suitable execution environment, e.g. on a virtual machine, on a computer or the like. The client component 120 may represent any unit, controlled by a machine or a human that may send requests, or queries, to the location service component 110 in order to obtain an estimate of a location related to a device 131. The device 131 is shown as being connected to the location service component 110 via a gateway location proxy 140 for providing positioning information about the device 131 to the location service component 110. As an example, the gateway location proxy 140 may be realized as an LWM2M proxy, which may include LWM2M-server- and/or LWM2M-client-functionality. The LWM2M server functionality of the gateway location proxy 140 may decode a message from the device 131, and may provide the message with its own location, and may invoke the LWM2M-client functionality of the gateway location proxy 140 to connect and communicate with the location service component 110, such as the location tracker agent 113 associated with the device 131.

Moreover, FIG. 1 depicts a further device 132 which is connected to the location service component 110 without passing the gateway location proxy 140. In this example, it is contemplated that the further device 132 is capable of reporting its location directly to the location service component 110, e.g. the further device 132 is equipped with a global positioning system (GPS).

As mentioned above, the embodiments may be implemented in the location service component 110. Purely as an example, the location query service 111, the location tracker agent 112, 113 and the neighbourhood tracker agent 114 may be described as follows. The actions of the location service component 110 may be organized in many other exemplifying manners.

The location query service 111 may be used by a user, such as the client component 120, to query a location of the device 131 and get back either a current location, if the device is in the second mode, or an estimate of the possible locations of the device 131, if the device 131 is in the first mode.

The location query service 111 may maintain a database (DB) mapping each device 131, 132 to an associated location tracker agent 112, 113. The location query service 111 may be implemented as an application/service in the cloud, or even in the client component 120.

When the location query service 111 is queried by the client component 120 for the location of e.g. the device 131, the location query service 111 sends, e.g., a GET request to the location tracker agent 113 to get the estimate of the location(s) of the device 131.

If the device 131 is in the second mode, one actual location of the device 131 may be returned to the client component 120.

If the device 131 is in the first mode, the estimate of the location(s) may include one or more estimates (along with a predicted set of devices in the neighbourhood—as will be described further).

The location tracker agent (LTA) 112, 113 may be associated with a respective digital shadow of each device 131, 132. The term "digital shadow" may refer to a software representation of a particular device. A purpose of the software representation may keep track of whether the device 131, 132 is in the first or second mode. Hence, the digital shadow and/or the location tracker agent 112, 113 may keep a register indicating whether the associated device 131, 132 is in the first mode or in the second mode. The digital shadow, such as so called a micro-service, may be located in the gateway location proxy 140, the location service component 110, the location tracker agent 112, 113 or the like.

The first mode may refer to that the device 131, 132 is not able to communicate with the location service component 110, e.g. due to the device 131, 132 having low/no power. The first mode may thus also be referred to as a low/no power mode.

The second mode may refer to that the device 131, 132 is able to communicate with the location service component 110. This is expected when the device 131, 132 has not malfunctioned and has sufficient power to be able to communicate with the location service component 110, or—when applicable—the gateway location proxy 140. Therefore, the second mode may also be referred to as normal power mode. The location tracker agent 112, 113 may further record the location of device 131, 132 when the devices 131, 132 are in the second mode.

In some examples, the location tracker agent 112, 113 may include a method for location and neighbourhood prediction which is used to provide an estimate of the location of the device 131 when it is in the first mode, whenever a location query for the device 131 is received. The location query may be received by the location service component 110, e.g. the location query service 111.

Either periodically, or at change of location, the device 131 may—when in the second mode—update the location tracker agent 112, 113, either directly or via the gateway location proxy, with the current location of the device 131.

The location tracker agent 112, 113 may be a software agent that is associated with the digital shadow of the device 131, such as an IoT device. The location tracker agent 112, 113 may be implemented as a web service and hosted in a server (not shown), which may be included in the location service component 110. One location tracker agent, such as one of the location tracker agents 112, 113, may be spawned at the time of enablement of the digital shadow representing said one location tracker agent. In particular, there may be one location tracker agent for each device, such as the devices 131, 132. In an embodiment, when the device 131 is deployed, the location tracker agent 113 may communicates with a bootstrap server (not shown) which starts and configures the digital shadow and the location tracker agent 113 corresponding to, or associated with, the device 131. Communication between the device 131 and the location tracker agent 113, or sometimes the digital shadow, may be effectuated through a protocol often simply referred to as light weight machine-to-machine (LWM2M).

Every location tracker agent 112, 113, associated with a respective device 131, 132, may have an internal query interface through which the location query service 111 may query the location of the device 131, 132 associated with the location tracker agent 112, 113. The location tracker agent 112, 113 may then return the location and, optionally, a set of identities relating to devices in a neighbourhood of the associated device 131, 132.

The neighbourhood tracker agent 114 may be implemented as a web service, e.g. using hypertext marked-up language transfer protocol (HTTP) or the like.

The neighbourhood tracker agent 114 may collect identities of a set of devices 132 that are associated with a given location and a given time. The set of devices 132 may be associated with the given location and the given time by that the devices of the set may be located in a vicinity, e.g. within a certain radius, of the given location at the given time. This may mean that the neighbourhood tracker agent 114 may map a location to a set of devices that may possibly be at that location, or at least in a vicinity of that location. The mapping by the neighbourhood tracker agent 114 may be dynamically updated as the location tracker agent 112, 113 update the location for devices 131, 132 in the second mode.

The neighbourhood tracker agent 114 may then return to the location tracker agent 112, 113 an initial set of data items, where each data item may include a respective estimate of the location and a set of identities representing one or more further devices in a neighbourhood of the device 131, e.g. in response to a command from any location tracker agent 112, 113.

The entities, such as components, agents, proxies, services, devices etc., may be embodied in the form of separate computers, software units, hardware units, combinations thereof or the like.

As used herein, the term "device" may refer to a user equipment, a machine-to-machine (M2M) device, a wireless communication device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 2:
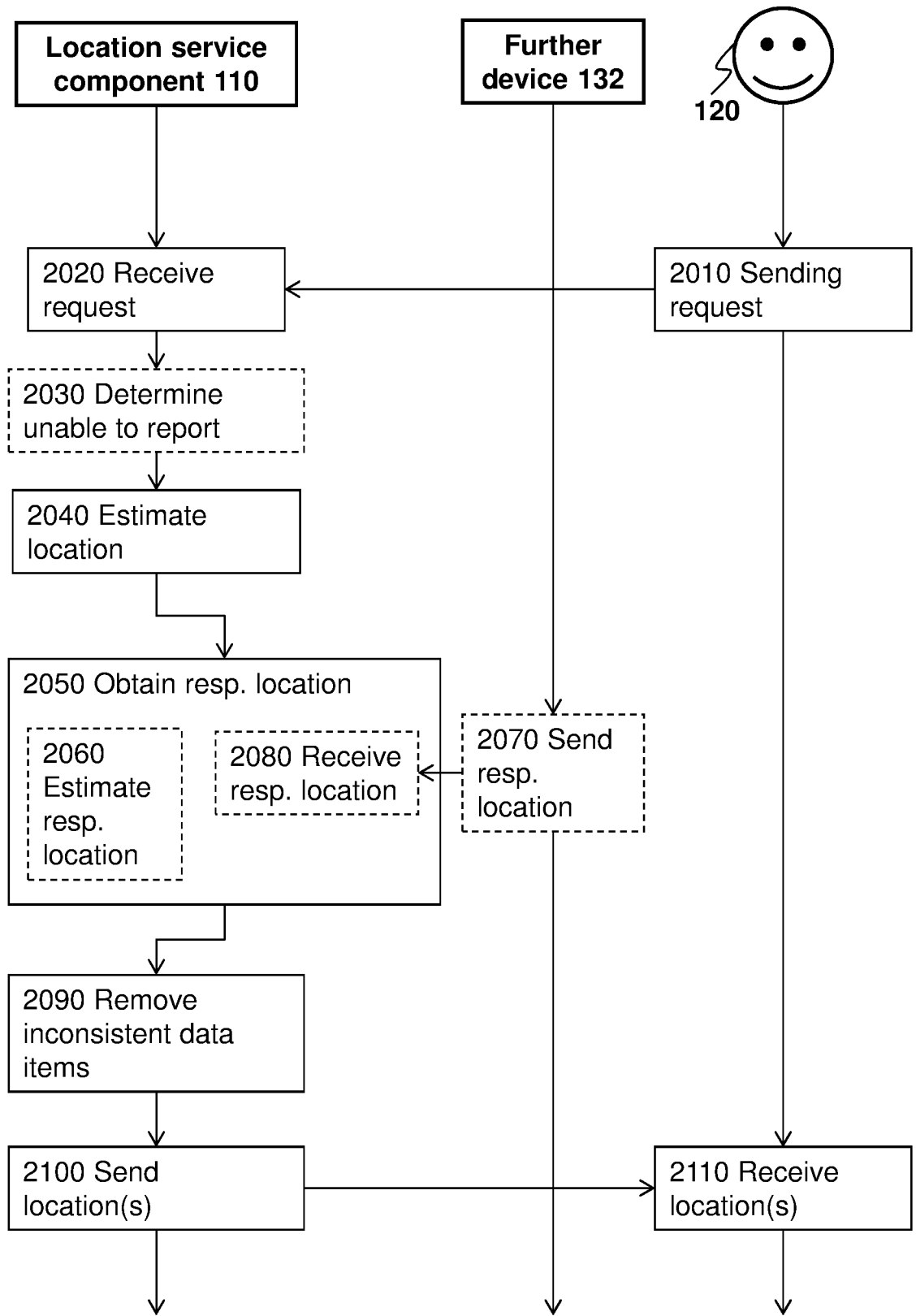
FIG. 2 is a combined signalling and flowchart illustrating the embodiments of the method herein.

With reference to FIG. 2, there is illustrated a scenario in which the device 131 is currently unable to report the location. Expressed differently, the device 131 is in the first mode, e.g. due to insufficient power and/or malfunction. Scenarios, in which the device 131 is in the second mode, aka normal mode, will be described with reference to FIG. 3 and FIG. 4.

FIG. 2 thus illustrates an exemplifying method according to embodiments herein when implemented in the system 100 of FIG. 1. The location service component 110 performs a method for providing at least one estimate of a location related to a device 131.

One or more of the following actions may be performed in any suitable order.

Action 2010

The client component 120 may send, to the location service component 110, a request for said at least one estimate of the location related to the device 131. The request may be sent for various reasons, such as that the location of the device 131 may indicate where an object, under transportation, may be located, a rental-period of the device 131 has expired, other reasons relating to lifecycle management and the like.

Action 2020

Subsequent to action 2010, the location service component 110 receives, from the client component 120, the request for said at least one estimate of the location related to the device 131.

Action 2030

The location service component 110 may determine that the device 131 is currently unable to report the location by initiating a check of a power level of the device 131. Should the location service component 110 determine that the device 131 is able to report the location, the device 131 may be said to be in the second mode, i.e. normal mode, which as mentioned in described further below.

As an example, the location service component 110 may transmit a test message towards the device 131 and if no response to the test message is received, e.g. within a certain time period and/or despite a certain number of transmissions of the test message, the location service component 110 may deduce that the device is in the first mode, i.e. unable to report its location.

Action 2040

At this stage, the location service component 110 may be aware that the device 131 is unable to report the location. Thus, the location service component 110 estimates the location based on a predictive model to obtain an initial set of data items. The predictive model may be based on a machine learning method, such as a last-N-items method or the like. Some examples relating to the predictive model will be described further below.

Each data item includes a respective estimate of the location related to the device 131 and a set of identities representing one or more further devices in a neighbourhood of the device 131. The set of identities may be said to represent neighbours to the device 131.

Action 2050

Now that the location service component 110 has obtained the set of identities, the location service component 110 obtains a respective location for each of said one or more further devices 132 based on the set of identities.

In this manner, the location service component 110 finds out, either as actual locations according to action 2080 and/or estimates of locations according to action 2060, where said one or more further devices are, or are estimated to be, located. Expressed differently, the obtaining of the respective location for each of said one or more further devices 132 may comprise at least one of action 2060 and action 2080, preferably one of actions 2060 and 2080.

Action 2060

The location service component 110 may estimate the respective location based on the predictive model.

Action 2070

The further device 132 may send, or report, on request or without request from the location service component 110, its respective location to the location service component 110.

Action 2080

Subsequent to action 2070, the location service component 110 may receive the respective location from said each of said one or more further devices 132. If available, the location service component 110 may prefer to use the received respective locations rather than the estimated respective locations for achieving increased accuracy.

Action 2090

In order to improve accuracy of at least one final estimate to be provided to the client component 120, the location service component 110 removes any data item from the initial set of data items that is inconsistent with the respective location for said one or more further devices 132 to obtain a pruned set of data items, which may include said at least one final estimate.

As an example, said any data item of the initial set of data items may be inconsistent with the respective location for said one or more further devices 132, in that said any data item may comprise a particular location associated with a particular identity. The particular location may be different from the respective location obtained for one of said one or more further devices 132 that are associated with the particular identity. The respective location may be an actual location, e.g. associated with a device in the second mode, or an estimate of a location, where the estimate is associated with a device in the first mode.

In this manner, expected neighbourhood information, such as the estimated respective location(s) and/or the received respective location(s), is used against the estimates of the location in the initial set of data items to refine the initial set of data items. As a result, the location service component 110 obtains the pruned set of data items.

In order not to make the description of the method of FIG. 2 overly complex, an example of removal of inconsistent data items is provided further below.

Action 2100

At this stage, for example in response to the request received in action 2020, the location service component 110 sends, to the client component 120, one or more respective estimates of the pruned set of data items, i.e. said at least one final estimate.

Action 2110

Subsequent to action 2100, the client component 120 may receive said one or more respective estimates of the location related to the device 131. Hence, the received one or more estimates may be used by the client component 120 according to the purpose as requested in action 2010.

It is believed that signalling, originating from the method above, in the system 110 may be insignificant in relation to signalling emanating from general reporting from the devices 131, 132. The general reporting may be measurement values, pictures from webcams or any other information that may be provided by a device, in particular an IoT device. In order to further reduce impact due to the method above, the signalling according to the present method may be aligned with such general reporting to reduce any unnecessary overhead, e.g. from control signalling, connection setup or the like.

Now looking into more detail of action 2090 above, the location service component 110 and/or the location tracker agent and/or the neighbourhood tracker agent may remove inconsistent data items according to the following. For simplicity, only the location service component 110 is referred to below.

The location service component 110 may be said to execute removal of inconsistent data items by running a filter method, whenever it gets a location estimate from the location tracker agent 112, 113. In this manner, some data items may be dropped due to inconsistency. Assume the device 131 to be device D.

Device D has a data item <location L, neighbourhood N> among its estimates, where there is a normal power device NormD in the neighbourhood N but with a different location than location L. This means the estimate is inconsistent with that actual location information.

Device NormD has a data item <location L, neighbourhood N> in its estimates, where there is a low/no power device LowD in the neighbourhood N but which does not have L in its estimates. Since the estimates always include the actual location (due to the property of the predictive model based on last-N-items algorithm), if LowD does not mention location L, it means that LowD is definitely not in the location L, hence the estimate of D is inconsistent with the current situation.

The deletion of any inconsistent pair may lead to a cascading effect, which eventually stabilizes. The cascading effect may refer to that data items, which before any pruning did not appear to be inconsistent, may after a first pruning turn out to be inconsistent. The pruning then continues until no inconsistent data items may be found. When a stable point is reached, i.e. there are no more inconsistent data items and hence no more deletions possible, the neighbourhood tracker agent may send the neighbourhood set for D to the location tracker agent 112, 113.

Example: Let D1, D2, . . . denote devices and P1, P2, . . . denote locations. Suppose the prediction of location estimates for LTA(D1) is $$\text{Estimate} = [<\{P1,\{D2,D3,D4\}\}>,<P2,\{D3,D4,D5\}>, <P3,\{D6,D7,D8\}>]$$

D1 says it could be at P1 and the neighbouring devices are {D2, D3, D4}.

Or D1 could be at P2 and the neighbouring devices are {D3, D4, D5}

Or D1 could be at P3 and the neighbouring devices are {D6, D7, D8}

Assume that D2 is in the second mode and LTA(D2)=[<P2, {D3, D4}>]. This means the actual position of D2 is P2. Then the possibility <P1, {D2, D3, D4}> is an inconsistent prediction and hence is pruned away.

This yields LTA(D1)=[<P2, {D3, D4, D5}>, <P3, {D6, D7, D8}>]

Suppose D3 is a device with low/no power and LTA(D3) is [<P2, {D4, D5}>, <P5 {D6, D7}>]

See that the system says—LTA(D1) thinks D3 should be at P2, but LTA(D3) does not think D1 should be at P2. This is an inconsistent condition.

So <P2, {D3, D4, D5}> is pruned from D1's prediction. This yields LTA(D1)=[<P3 {D6, D7, D8}>] for D1.

Assuming at this point that the positions of devices D6, D7, D8 are consistent with P3, the pruning process will stop and the position reported by location query service 111 will be {P3}.

Figure 3:
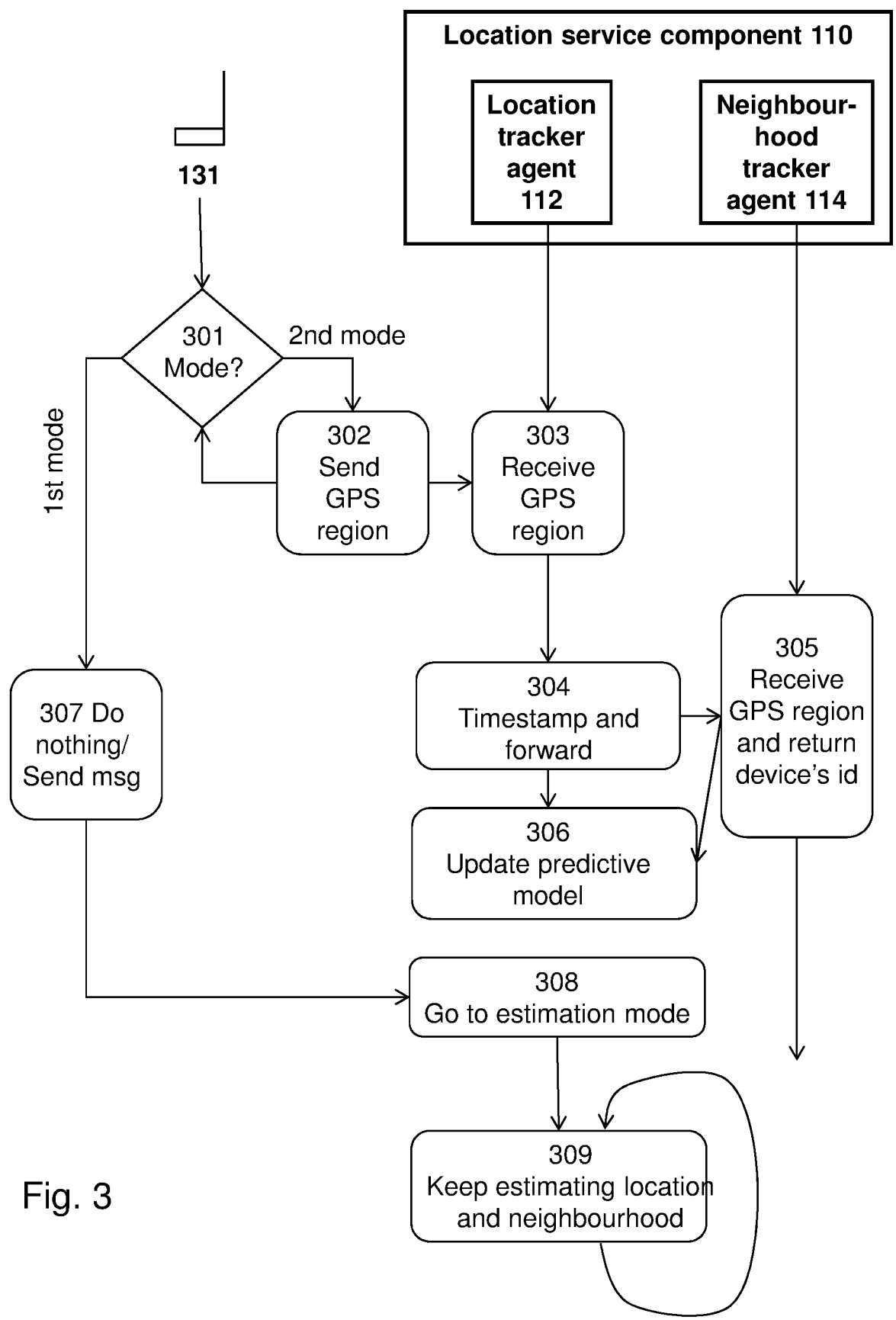
FIG. 3 is a flowchart illustrating embodiments of the method in the location service component.

Referring to FIG. 3, a combined signalling and flowchart with reference to both the first and second modes of the device 131 is illustrated. In this example, the predictive model is updated. This may mean that known, and actual, information about a particular location of a particular device, such as the device 131 and/or the further device 132 and/or other device (not shown), is fed into the predictive model. Thereby, information held by the predictive model is up-to-date, which typically yields improved accuracy.

Moreover, the location service component 110 may be embodied in the form of the location tracker agent 112, which may at least include the functionality of the digital shadow, and the neighbourhood tracker agent 114. This means that when an action is described as being performed by the location tracker agent 112, the action may also be performed by the location service component 110. Similarly, when the action is described as being performed by the neighbourhood tracker agent 114, the action may also be performed by the location service component 110.

One or more of the following actions may be performed in any suitable order.

Action 301

The device 131 may check its mode. As an example, the device 131 may check whether or not it is able to communicate with e.g. the location tracker agent 112. If the device 131 is able to communicate, the device 131 may determine that it is in the second mode. It may also be that the device 131 checks its power level and if the power level is above a certain threshold, the device may again determine that it is in the second mode. When the device 131 is in the second mode, action 302 is performed.

When the device 131 fails to determine that it is in the second mode, the device 131 determines that it is in the first mode, e.g. the device 131 may not be able to communicate with the location tracker agent 112 and/or the power level may be below the certain threshold. When the device 131 is in the first mode, action 307 is performed.

This action may be similar to action 2030 of FIG. 2.

Action 302

In order to provide the location tracker with actual location information, the device 131 may send information about a GPS region in which it is located to the location tracker agent 112. Here, the GPS region is taken as an example of a location related to the device 131. The location related to the device 131 may thus comprise one or more of the GPS region, a GPS coordinate, a geographical coordinate, a geographical region, a number representing an area and/or position and the like.

Action 303

Subsequent to action 302, the location tracker agent 112 may receive the GPS region for the device 131. In this manner, it is ensured that the location tracker agent 112 is aware of, or known, an exact location, e.g. expressed as the GPS region, of the device 131.

Action 304

The location tracker agent 112 may assign a timestamp to the received GPS region information for the device 131 and forward the GPS region to the neighbourhood tracker agent 114.

Action 305

Subsequent to action 304, the neighbourhood tracker agent 114 may thus receive the GPS region information. Based on the GPS region information, the neighbourhood tracker agent 114 may find out which devices are located in that GPS region. Upon reading locations for devices, the neighbourhood tracker agent 114 picks device identities of those devices that are located in the GPS region. Then, the neighbourhood tracker agent 114 sends, or returns, the devices' identities (ids) to the location tracker agent 112.

This mean for example that whenever the neighbourhood tracker agent 114 receives a location message, such as the GPS region or the like, forwarded by the location tracker agent 112, the neighbourhood tracker agent 114 sends back the <location_D, neighbourhood-device-ids(location_D)> to the location tracker agent 112.

Action 306

When receiving the devices' identities, the location tracker agent 112 may update the predictive model with the received GPS region and the returned devices' identities (id).

Action 307

Following action 301, it may be that the device 131 is in the first mode. Therefore, in this action, the device 131 may do nothing.

In some examples, it may be possible to send a message to the location tracker agent 112. The message may indicate that the first mode is entered. This may be registered by the location tracker agent 112. Clearly, no messages can be sent during the first mode, but as an exception is may sometimes thus be possible to send the message just before entering the first mode.

When the device 131 is in the first mode, there is no new location message. Based on timeout, the location tracker agent 112 may register that the device 131 is in the first mode. The location tracker agent 112 may then start to estimate the set of locations/neighbourhoods regularly, or irregularly.

Action 308

In case action 307 included the sending of the message, the location tracker agent 112 may receive the message and register, such as store, that the device 131 is in the first mode. This may be expressed as that the location tracker agent 112 goes to estimation mode. For example, a value of one of an indication may indicate that the device is in the first mode and a value of two of the indication may indicate that the device is in the second mode. The value of the indication may be stored. Then, as shall be seen in FIG. 4, the location tracker agent 112 may check the mode by retrieving the indication and when the value of the indication is one, the location tracker agent 112 may deduce that the device 131 is in the first mode and when the value of the indication is two, the location tracker agent 112 may deduce that the device 131 is in the second mode.

Action 309

The location tracker agent 112 may, regularly or irregularly, estimate the location of the device 131 as is described in more detail with reference to FIG. 2 and FIG. 4.

Figure 4:
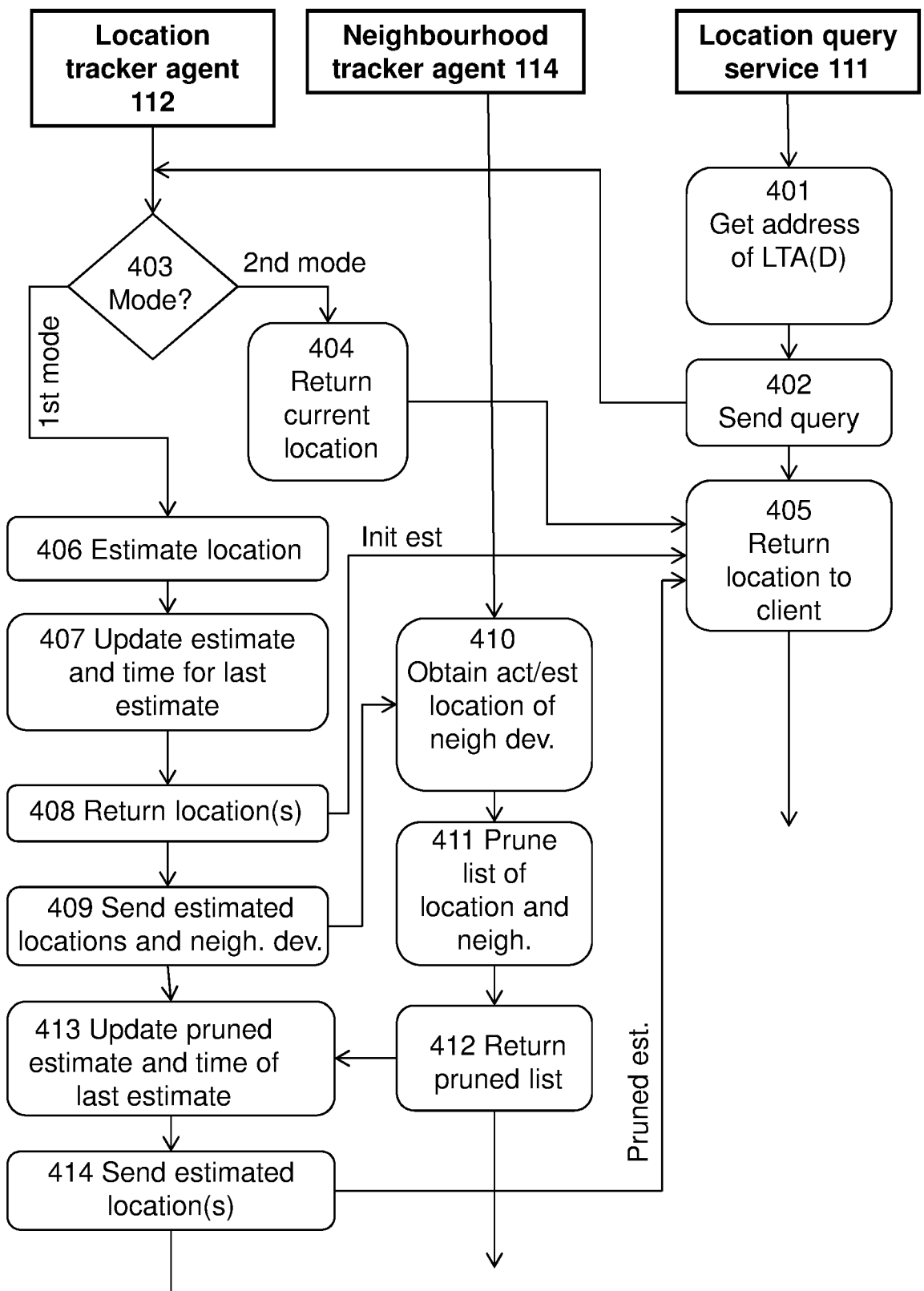
FIG. 4 is a further flowchart illustrating further embodiments of the method in the location service component.

FIG. 4 illustrates a combined signalling and flowchart with reference to both the first and second modes of the device 131. In this example, the request for said at least one estimate of the location of the device 131 is handled. As is seen from the Figure, the device 131 need not be involved, irrespectively of whether it is in the first or second mode.

Moreover, just as in FIG. 3, the location service component 110 may be embodied in the form of the location tracker agent 112, which may at least include the functionality of the digital shadow, and the neighbourhood tracker agent 114. This means that when an action is described as being performed by the location tracker agent 112, the action may also be performed by the location service component 110. Similarly, when the action is described as being performed by the neighbourhood tracker agent 114, the action may also be performed by the location service component 110.

One or more of the following actions may be performed in any suitable order.

Action 401

The location query service 111, e.g. as a particular device register with it in order to allow the location query service 111 to return the location of the particular device, may get an address of the location tracker agent 112, which accordingly may be associated with the particular device, such as the device 131.

Action 402

The location query service 111 sends a query to the location tracker agent 112, e.g. in response to a request from the client component device 120 according to action 2010 of FIG. 2. The request of action 402 may be the same or similar as in action 2010 and/or 2020 of FIG. 2.

Action 403

Subsequent to action 402, the location tracker agent 112 may thus receive the query from the location query service 111. In response thereto, the location tracker agent 112 may check the mode related to the device 131, which in this example is assumed to be associated with the location tracker agent 112. The location tracker agent 112 may check the mode similarly to as in action 2030 of FIG. 2. When the location tracker agent 112 finds that the device 131 is in the first mode, action 406 may be performed. Alternatively, when the location tracker agent 112 finds that the device 131 is in the second mode, action 404 may be performed.

This action may be similar to action 2030 of FIG. 2.

Action 404

In response to the query for the location from the location query service 111, the location tracker agent 112 sends, or returns, a current location related to the device 131 when the device 131 is in the second mode, or at least when the location tracker agent 112 has registered that the device 131 is in the second mode.

In this manner, the location tracker agent 112 may return an exact location, or almost exact location, of the device 131 to the location query service 111. The exact location shall be understood as being in contrast to an estimate of the location as may be obtained by the predictive model in case the device 131 is considered to be in the first mode, e.g. the low/no power mode.

Action 405

Subsequent to action 404, the location query service 111 receives the current location from the location tracker agent 112. Moreover, in order to inform the client component 120 about the current location, the location query service 111 sends, or forwards, the current location to the client component 120.

Action 405 may also be performed subsequent to action 408 and/or action 414 as will be explained further below.

Action 406

When it is, in action 403, found that the device 131 is in the first mode, action 406 may be performed. Accordingly, the location tracker agent 112 may estimate the location, or one or more locations, of the device 131 based on the predictive model. In this manner, a current estimate of the location of the device 131 is obtained. Typically, there may be more than one current estimate. Hence, the current estimate may be referred to as the "current estimate(s)". The predictive model also provides one or more identities of neighbouring devices. Compare with the data items mentioned in connection with action 2040. Hence, this action may be similar to action 2040 of FIG. 2.

In another implementation, the neighbourhood tracker agent 114 may run the prediction model to obtain the current estimate(s) and a list of neighbouring devices, e.g. the set of identities representing one or more further devices in the neighbourhood of the device 131. This may be more accurate than the predictions run in the location tracker agent 112 of each device, because the global topology of devices as viewed by the neighbourhood tracker agent 114 has the correlation between all the devices. On the other hand, when the prediction is done within the location tracker agent 112, the agent has only the immediate neighbourhood function and not the complete topology. This leads to loss of accuracy. However, since the number of devices is large it may not be computationally efficient to do prediction in a central place like the neighbourhood tracker agent 114. Hence, there is a trade-off between accuracy and efficiency.

Action 407

Since the current estimate is obtained, the location tracker agent 112 may register a timestamp for a most recent estimate, i.e. a last estimate. The predictive model may also be update with the last estimate and the timestamp.

Action 408

In this action, the location tracker agent 112 may send, or return, the current estimate of the location to the location query service 111. In this way, the location tracker agent 112 provides an initial set of locations, denoted "init est" in the Figure, to the location query service 111. Accuracy of the initial set may be improved as will be explained with reference to e.g. one or more of actions 409-414. This action may be performed before or after action 407, but preferably subsequent to action 406.

Recalling the comment of action 405, the location query service 111 may send, or forward, the received current estimate of the location subsequent to action 408 to the client component 120.

Action 409

In order to improve accuracy of the initial set of locations, the location tracker agent 112 sends the current estimate(s) and said one or more identities of neighbouring devices obtained by the estimation in action 406. This action may be similar to action 2060 of FIG. 2.

Hence, as an example, when the location tracker agent 112 gets a location query for the device 131 which is in the first mode, the location tracker agent 112 sends the estimates {<location L1, neighbourhood N1> . . . <location Lk, neighbourhood Nk>} for the device 131 in a POST message to the neighbourhood tracker agent 114.

Action 410

Subsequent to action 409, the neighbourhood tracker agent 114 receives the current estimate(s) and said one or more identities of neighbouring devices. Now, the neighbourhood tracker agent 114 obtains locations for said one or more identities of neighbouring devices. The locations may be estimates obtained by means of the predictive model, e.g. for neighbouring devices that are in the first mode. Alternatively or additionally, the location may be actual locations received in response to requests to neighbouring device that are in the second mode.

Action 411

Since the neighbourhood tracker agent 114 has both the current estimate(s) and the associated neighbours and the locations of the neighbours, the neighbourhood tracker agent 114 may now prune the current location(s) by removing inconsistent information. Reference is made to the example of pruning given above. This action may be similar to action 2090 of FIG. 2.

Action 412

In order to inform the location tracker agent 112 about the pruned location(s), the neighbourhood tracker agent 114 may send, or return, the pruned location(s) and associated neighbours to the location tracker agent 112.

Action 413

Subsequent to action 412, the location tracker agent 112 may receive the pruned location(s). The location tracker agent 112 may also, similarly to action 407, update the predictive model with a timestamp, the pruned location(s) and the associated neighbours.

Action 414

In order to inform the location query service 111, the location tracker agent 112 may send the estimated pruned location(s) to the location query service 111.

Recalling the comment of action 405, the location query service 111 may send, or forward, the received pruned estimate(s) of the location subsequent to action 414 to the client component 120. This action may be similar to action 2100 and/or 2110 of FIG. 2.

Figure 5:
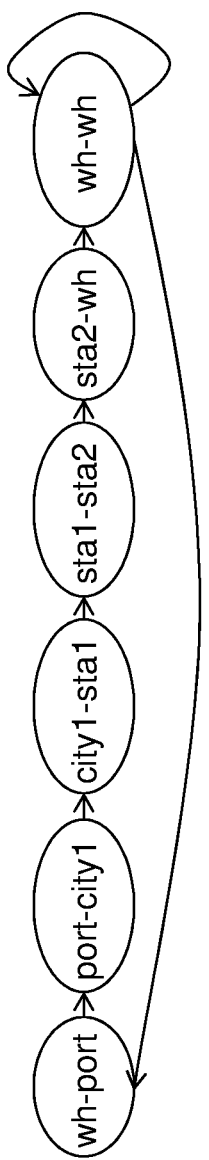
FIG. 5 is a state sequence diagram illustrating an exemplifying sequence of states.

Turning to FIG. 5, an exemplifying predictive model is illustrated. In the following example, update of the model and location estimation by means of the model is described.

Assume that a location history of four devices, such as two container sensors S1 and S2, and two trucks T1 and T2 are recorded in respective location tracker agents (LTAs). The notion LTA(S1) and the like is used to denote that the location tracker agent is associated with the sensor S1.

Assume that the following happens every week for a number of weeks and then S1 runs out of battery when in city1 on Tuesday. On Monday, it needs to be known where the container is. Assume further that the sensor reading is done once per day. LTA(S1) (similarly S2) sends the location to the neighbourhood tracker agent (NTA) and the NTA returns the <location, neighbourhood devices-id's> data items to LTA(S1). The locations of the data items may be any one of port, city1, station1 (sta1), station2 (sta2), warehouse (wh) or the like.

LTA for Sensor S1:
Monday: <port, {T1,T2, S2}>,
Tuesday: <city1, {T1, S2}>,
Wednesday: <station1, {T1, S2}>,
Thursday: <station2, {S2}>,
Friday: <Warehouse, {S2}>,
Saturday: <Warehouse, {S2}>,
Sunday: <Warehouse, {S2}>

LTA for Sensor S2:
Monday: <port, {T1, T2, S1}>,
Tuesday: <city1, {T1, S1}>,
Wednesday: <station1, {T1, S1}>,
Thursday: <station2, {S1}>,
Friday: <Warehouse, {S1}>,
Saturday: <Warehouse, {S1}>,
Sunday: <Warehouse, {S1}>

Last-2 locations (Last-N items for N=2 and restricted to locations) gives the following predictive model for both S1 and S2 (FIG. 3). Each state of the model gives the possible locations of S1.

For example, the state "wh-port" says S1 is possibly in the warehouse (wh) or at the port. It is used as a predictive model as follows: if S1 is in the state "wh-wh" which means it is in the warehouse, the next day it could in "wh-port" or "wh-wh" state which denotes S1 is in warehouse or port.

The initial estimate for S1 produced by LTA(S1) is: {<warehouse, {S2}>, <port, {T1, T2, S2}}. This is done when S1 runs out of battery when in city1 on Tuesday.

For better estimation, LTA(S1) sends the above initial estimate to NTA. NTA then requests the LTA of all the devices that are in the estimate of LTA(S1) (Here it is only S2). The LTA for all these devices return either the actual position (if in the second mode) or the estimate (if in the first mode). In this case, the actual position of S2 given by LTA(S2) is {<port, {T1, T2}}. Hence, the refined estimate of S1 produced by NTA is: {<port, {T1, T2, S2}}. This is returned to LTA(S1).

Predictive Model and Updating Thereof

The predictive model is based on the Last-N items algorithm. It is well-known in the literature.

The initial state of the predictive model is "p0" where p0 denotes the quantized zone containing the position p0 marked with the definite tag and the neighbouring devices.

Whenever a new position message is received from the device/gateway, the trajectory is updated and the model is updated as well. For example, after the initial state, as soon as the second definite position information is available, the trajectory is updated to: "$p_0$-$p_1$". The model is updated to have two states "$p_0$" and "$p_0$-$p_1$", and an edge "$p_0$"→"$p_0$-$p_1$".

The model essentially abstracts the last n positions into a state. For convenience, these states can be represented as strings of length $\Leftarrow$n with n state labels concatenated. This is required to maintain a finite state model whose edges are weights reflecting the frequency of the state transitions in the trajectory. This is done by the following steps where a suffix state "$p_k$- ... $^-p_{k+n-1}$" and a new position "$p_{k+n}$" is obtained.

1. It is checked if the n-suffix "$p_{k+1}$- ... -$p_{k+n}$" is a new suffix in which case a new state is created.

2. Add the edge "$p_k$- ... -$p_{k+n-1}$"→"$p_{k+1}$- ... -$p_{k+n}$"

3. Current state is updated to "$p_{k+1}$- ... -$p_{k+n}$"

Figure 6A:
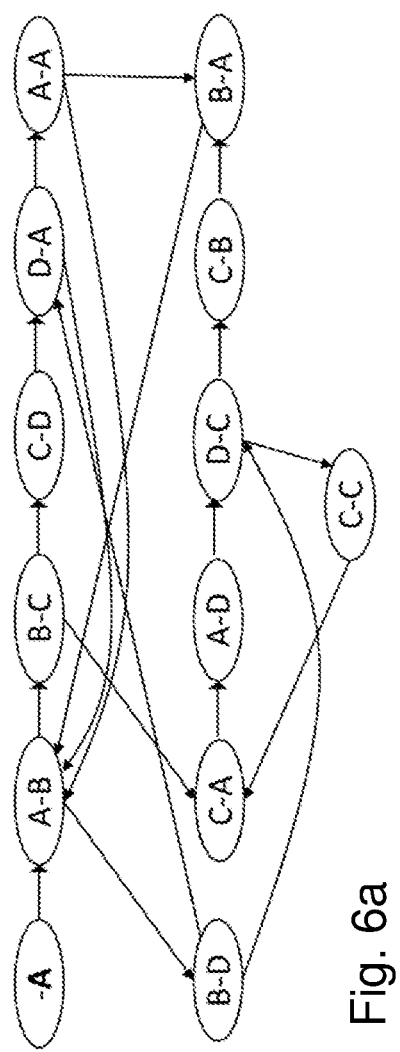
FIG. 6a and FIG. 6b illustrate state sequence diagrams for last-n-item models.
Figure 6B:
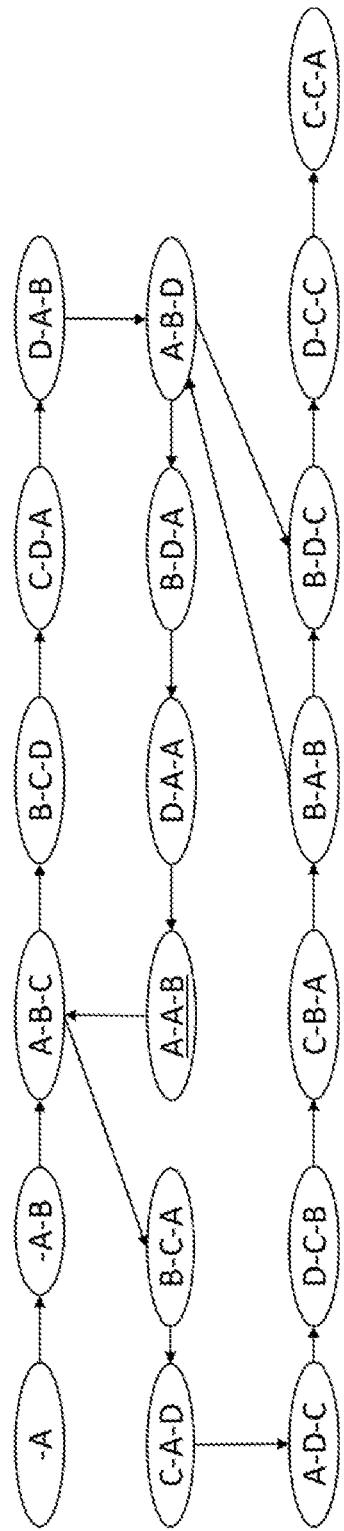

With reference to FIG. 6a and FIG. 6b, a position information sequence and the updated model are illustrated. Here, A, B, C and D are locations. In the first model, n=2 has been taken. In the $2^{nd}$ model n=3 is used. In the first model, since n=2, all the states are labelled as Y-X, where the current location is X and Y is the previous location. In the second model, since n=3, all the states are labelled Z-Y-X, where the current location is X, the previous locations are Y and Z.

Assume that the last known state is C-A. If it is desired to estimate the states after 5 time steps of the last known state, they will be {A-B, A-D} and hence the position will be one of {B, D}. The larger values of n result in more accuracy, but also a larger state space of the model, since the state space increases with increasing values of n.

Figure 7:
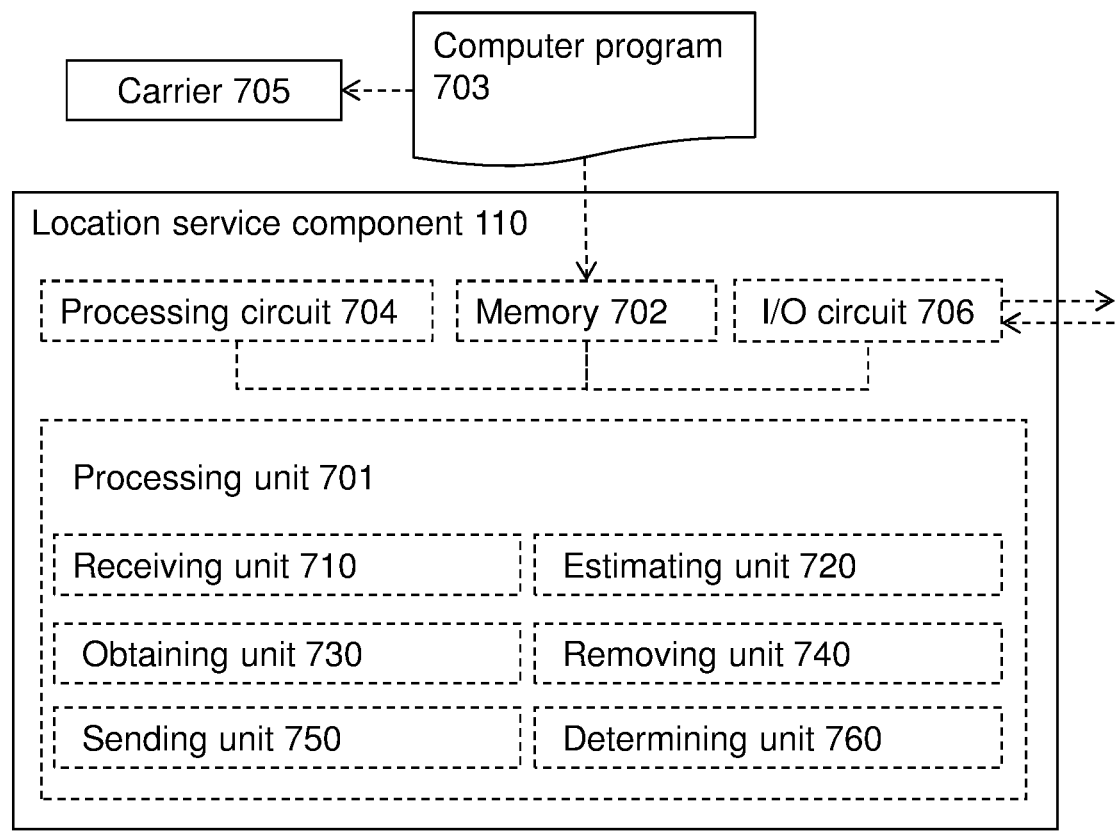
FIG. 7 is a block diagram illustrating embodiments of the location service component.

With reference to FIG. 7, a schematic block diagram of embodiments of the location service component 110 of FIG. 1 is shown.

The location service component 110 may comprise a processing unit 701, such as a means for performing the methods described herein. The means may be embodied in the form of one or more hardware units and/or one or more software units. The term "unit" may thus refer to a circuit, a software block or the like according to various embodiments as described below.

The location service component 110 may further comprise a memory 702. The memory may comprise, such as contain or store, instructions, e.g. in the form of a computer program 703, which may comprise computer readable code units.

According to some embodiments herein, the location service component 110 and/or the processing unit 701 comprises a processing circuit 704 as an exemplifying hardware unit, which may comprise one or more processors. Accordingly, the processing unit 701 may be embodied in the form of, or 'realized by', the processing circuit 704. The instructions may be executable by the processing circuit 704, whereby the location service component 110 is operative to perform the methods of FIG. 2. As another example, the instructions, when executed by the location service component 110 and/or the processing circuit 704, may cause the location service component 110 to perform the method according to FIG. 2.

In view of the above, in one example, there is provided a location service component 110 for providing at least one estimate of a location related to a device 131. As mentioned, the device 131 is currently unable to report the location. Again, the memory 702 contains the instructions executable by said processing circuit 704 whereby the location service component 110 is operative for:

receiving, from a client component 120, a request for said at least one estimate of the location related to the device 131, estimating the location based on a predictive model to obtain an initial set of data items, wherein each data item includes a respective estimate of the location related to the device 131 and a set of identities representing one or more further devices in a neighbourhood of the device 131, obtaining a respective location for each of said one or more further devices 132 based on the set of identities, removing any data item from the initial set of data items that is inconsistent with the respective location for said one or more further devices 132 to obtain a pruned set of data items, and sending, to the client component 120, one or more respective estimates of the pruned set of data items.

FIG. 7 further illustrates a carrier 705, or program carrier, which comprises the computer program 703 as described directly above. The carrier 705 may be one of an electronic signal, an optical signal, a radio signal and a computer readable medium.

In some embodiments, the location service component 110 and/or the processing unit 701 may comprise one or more of a receiving unit 710, an estimating unit 720, an obtaining unit 730, a removing unit 740, a sending unit 750, and a determining unit 760 as exemplifying hardware units. The term "unit" may refer to a circuit when the term "unit" refers to a hardware unit. In other examples, one or more of the aforementioned exemplifying hardware units may be implemented as one or more software units.

Moreover, the location service component 110 and/or the processing unit 701 comprises an Input/Output (I/O) circuit 706, which may be exemplified by the receiving unit and/or the sending unit when applicable.

Accordingly, the location service component 110 configured for providing at least one estimate of a location related to a device 131. The device 131 is currently unable to report the location.

Therefore, according to the various embodiments described above, the location service component 110 and/or the processing unit 701 and/or the receiving unit 710 is configured for receiving, from a client component 120, a request for said at least one estimate of the location related to the device 131.

The location service component 110 and/or the processing unit 701 and/or the estimating unit 720 is configured for estimating the location based on a predictive model to obtain an initial set of data items. The predictive model may be based on a machine learning method. The machine learning method may comprise a last-N-items method or the like.

Each data item includes a respective estimate of the location related to the device 131 and a set of identities representing one or more further devices 132 in a neighbourhood of the device 131.

The location service component 110 and/or the processing unit 701 and/or the obtaining unit 730 is configured for obtaining a respective location for each of said one or more further devices 132 based on the set of identities.

The location service component 110 and/or the processing unit 701 and/or the removing unit 740 is configured for removing any data item from the initial set of data items that is inconsistent with the respective location for said one or more further devices 132 to obtain a pruned set of data items.

The location service component 110 and/or the processing unit 701 and/or the sending unit 750 is configured for sending, to the client component 120, one or more respective estimates of the pruned set of data items.

Said any data item of the initial set of data items may be inconsistent with the respective location for said one or more further devices 132 in that said any data item may comprise a particular location associated with a particular identity. The particular location may be different from the respective location obtained for one of said one or more further devices 132 that is associated with the particular identity.

The location service component 110 and/or the processing unit 701 and/or the obtaining unit 730 may be configured for obtaining the respective location for each of said one or more further devices 132 by that the location service component 110 and/or the processing unit 701 and/or the estimating unit 720, or a further estimating unit (not shown), may be configured for estimating the respective location based on the predictive model, or by that the location service component 110 and/or the processing unit 701 and/or the receiving unit 710, or a further receiving unit (not shown), may be configured for receiving the respective location from said each of said one or more further devices 132.

The location service component 110 and/or the processing unit 701 and/or the determining unit 760 may be configured for determining that the device 131 is currently unable to report the location by initiating a check of a power level of the device 131.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, a software module, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a location service component, for providing at least one estimate of a location of a device, wherein the device is currently unable to report the location, wherein the method comprises:

receiving, from a client component, a request for said at least one estimate of the location of the device, estimating the location based on a predictive model to obtain an initial set of data items, wherein each data item includes a respective estimate of the location of the device and a set of identities representing one or more further devices in a neighbourhood of the device, obtaining a respective location for each of said one or more further devices based on the set of identities, wherein the respective location for each of said one or more further devices comprises an actual location from each further device capable of transmitting its actual location and an estimated location for each further device that is incapable of transmitting its actual location, removing any data item from the initial set of data items that is inconsistent with the respective location for said one or more further devices to obtain a pruned set of data items, wherein said any data item of the initial set of data items is inconsistent with the respective location for said one or more further devices and is removed from the initial set of data items in response to the actual location or the estimated location for said one or more further devices being different from a particular respective estimate of the location of the device that is associated with the identity foresaid one or more further devices included in the set of identities in the initial set of data items, and sending, to the client component, one or more respective estimates of the pruned set of data items.

2. The method according to claim 1, wherein the obtaining of the estimated location for each of said one or more further devices that is incapable of transmitting its actual location comprises:

estimating the respective location based on the predictive model.

3. The method according to claim 1, wherein the predictive model is based on a machine learning method.

4. The method according to claim 3, wherein the machine learning method comprises a last-N-items method.

5. The method according to claim 1, wherein the method comprises:

determining that the device is currently unable to report the location by initiating a check of a power level of the device.

6. A non-transitory computer readable medium, comprising computer readable code units which when executed on a location service component causes the location service component to perform a method according to claim 1.

7. A location service component configured for providing at least one estimate of a location of a device, wherein the device is currently unable to report the location, wherein the location service component is configured for:

receiving, from a client component, a request for said at least one estimate of the location to of the device, estimating the location based on a predictive model to obtain an initial set of data items, wherein each data item includes a respective estimate of the location of the device and a set of identities representing one or more further devices in a neighbourhood of the device, obtaining a respective location for each of said one or more further devices based on the set of identities, wherein the respective location for each of said one or more further devices comprises an actual location from each further device capable of transmitting its actual location and an estimated location for each further device that is incapable of transmitting its actual location, removing any data item from the initial set of data items that is inconsistent with the respective location for said one or more further devices to obtain a pruned set of data items, wherein said any data item of the initial set of data items is inconsistent with the respective location for said one or more further devices and is removed from the initial set of data items in response to the actual location or the estimated location for said one or more further devices being different from a particular respective estimate of the location for the device that is associated with the identity foresaid one or more further devices included in the set of identities in the initial set of data items, and sending, to the client component, one or more respective estimates of the pruned set of data items.

8. The location service component according to claim 7, wherein the location service component is configured for obtaining the respective location for each of said one or more further devices by one of:
  estimating the respective location based on the predictive model, and
  receiving the respective location from said each of said one or more further devices.

9. The location service component according to claim 7, wherein the predictive model is based on a machine learning method.

10. The method according to claim 9, wherein the machine learning method comprises a last-N-items method.

11. The location service component according to claim 7, wherein the location service component is configured for:
  determining that the device is currently unable to report the location by initiating a check of a power level of the device.

* * * * *